C. H. KORS.

BOX.

APPLICATION FILED JUNE 16, 1919.

Reissued Oct. 7, 1919.

14,732.

3 SHEETS—SHEET 1.

INVENTOR

Charles H. Kors

BY

Bartlett & Brownell

HIS ATTORNEYS

THE COLUMBIA PLANOGRAPH CO., WASHINGTON, D. C.

C. H. KORS.
BOX.
APPLICATION FILED JUNE 16, 1919.
Reissued Oct. 7, 1919.
14,732.
3 SHEETS—SHEET 2.
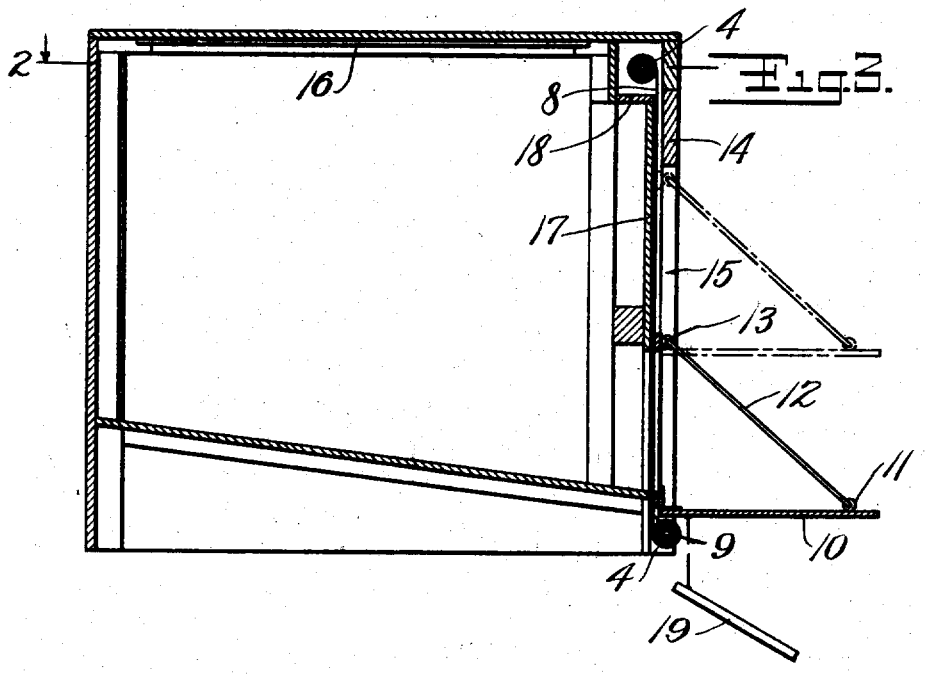
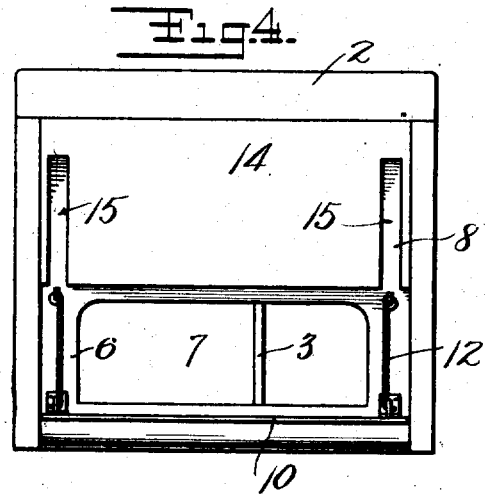
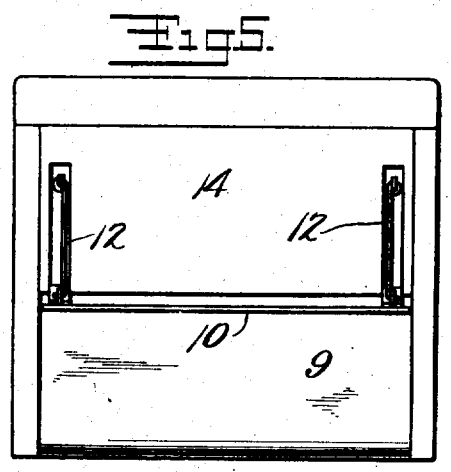
INVENTOR
Charles H. Kors
BY
Bartlett & Brown
HIS ATTORNEYS.
THE COLUMBIA PLANOGRAPH CO., WASHINGTON, D. C.

C. H. KORS.

BOX.

APPLICATION FILED JUNE 16, 1919.

Reissued Oct. 7, 1919.

14,732.

3 SHEETS—SHEET 3.

INVENTOR

Charles H. Kors

BY

Bartlett & Brown

HIS ATTORNEYS

UNITED STATES PATENT OFFICE.

CHARLES H. KORS, OF PHILADELPHIA, PENNSYLVANIA.

BOX.

14,732. Specification of Reissued Letters Patent. Reissued Oct. 7, 1919.

Original No. 1,232,935, dated July 10, 1917, Serial No. 126,651, filed October 20, 1916. Application for reissue filed June 16, 1919. Serial No. 304,697.

*To all whom it may concern:*

Be it known that I, CHARLES H. KORS, a citizen of the United States, residing at Philadelphia, county of Philadelphia, State of Pennsylvania, and formerly of Poughkeepsie, county of Dutchess, and State of New York, have invented certain new and useful Improvements in Boxes, of which the following is a full, clear, and exact description.

My invention relates to improvements in closed boxes and has for its object to provide a new and improved box which is normally closed but easily opened by a movement of the hand such as would be necessary for the simple picking up of an exposed object. It further has for its object to provide a humidifying cigar worker's box in which the tobacco to be made into cigars and the like is kept in a moist condition, the box being normally closed, which box is easily opened and automatically closes after portions of the tobacco have been removed.

The following is a description of an embodiment of my invention, reference being had to the accompanying drawings, in which, Figure 1 is a perspective of a box embodying my invention with the shelf released;

Fig. 3 is a transverse section on the line 3—3 Fig. 2;

Fig. 4 is a front view of the box with the closure in open position;

Fig. 5 is a similar view with the closure in closed position;

Figure 1:
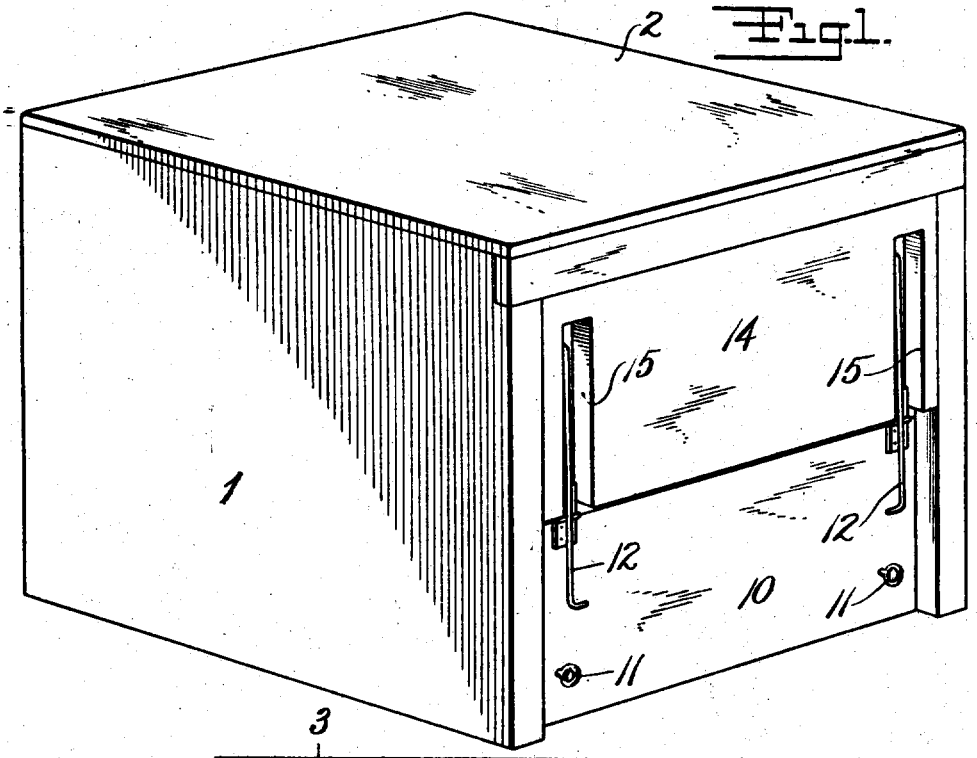
Figure 2:
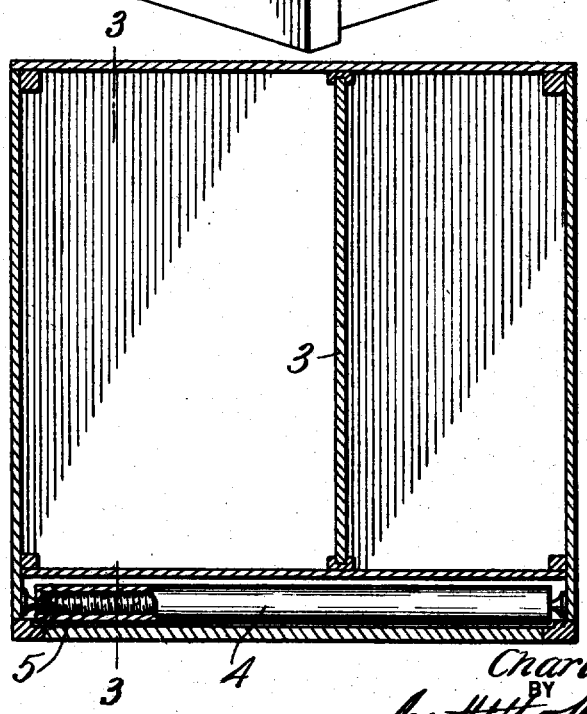
Fig. 2 is a plan view of the same with the cover removed.

Referring more particularly to the drawings, 1 is a box body having a removable cover 2 and a partition 3 for dividing the interior of the box into two compartments. At the upper and lower front edges of the box are located spring rollers 4, having winding springs 5, and the spring of the upper roller 4 is sufficiently strong to overcome the spring of the lower roller 4 and acts in opposition thereto. Carried by these two rollers is a curtain consisting of a frame portion 6 having an opening 7, which opening extends to both sides of the partition 3 (Fig. 4) and solid flexible end pieces. To the upper edge of the frame, which may be made of wood or other suitable material, is connected one end piece, a canvas section 8, which winds upon the upper roller 4. To the lower edge of the frame 6 is connected the other end piece, an extended rubber section 9, which winds upon the lower roller 4. To the lower end of the frame is hinged a rest or platform 10 provided with eyes 11, which are engaged by hooks 12, whose upper ends are supported by the upper end of the frame at eyes 13. The upper portion of the face of the box is provided with a depending wall 14 having slots 15 for permitting the upward movement of the eyes 13, to which the upper ends of the hooks 12 are connected. When the box is not in use the hooks 12 are disengaged from the eyes 11, the curtain being drawn upward so that the frame 6 is behind a portion of the wall 14 and the platform 10 falling downward as a flap so as to be in a perpendicular position, covering a portion of the rubber section 9. When the box is adjusted for use, the hooks 12 are made to engage the eyelets 11 so as to hold the platform 10 in a horizontal position as shown in Fig. 5. Upon using the box, the operator presses his hand upon the horizontal rest or platform 10, depressing the same to the position shown in Fig. 4, thus bringing the opening in the curtain in line with the opening in the box and exposing the tobacco which is in the compartments formed by the partition 3 so as to make it accessible. He then takes the desired amount of tobacco from one or both of the compartments, draws it beyond the platform 10 to his working table, and makes it up into the desired roll. As the tobacco is drawn from the platform 10, the platform is released and the spring of the upper roller 4 draws the compound curtain up so that the parts assume the position shown in Fig. 5, the box being thereupon closed so as to maintain the remaining tobacco within the box in a moist condition, the air in the interior of the box being moistened by moisture in pads 16 secured to the top thereof. The upper roller and the upper portion of the compound curtain are protected by a stationary wall 17, offset at 18 so as to protect the same from the moisture within the box.

The lower portion of the curtain is made of rubber so as to form an impervious closure and to enable that closure to withstand the effect of the moisture within the box to which it is exposed most of the time, the other portions of the curtain not being exposed to such moisture for any considerable time.

With the box so constructed, the time to which the tobacco within the box is exposed to the atmosphere is reduced to a minimum and yet the opening of the box requires little voluntary effort on the part of the worker. It not only keeps the stock on hand in a suitable moist condition for working but also prevents the stock from being contaminated by dirt or germs in the surrounding atmosphere and does away with the filthy moistened cloths heretofore used to cover the stock when kept in trays. It also makes it possible to issue to the operator a large supply of stock at one time, enough for a half day's work, and maintains the tobacco in suitable condition, even if the stock so issued is left standing during the noon hour or over night.

The cigar-maker reaching for his required stock lays his hands on the projecting platform or shelf. The weight of the hands causes the platform to go down to its lowest point, bringing with it the rigid frame-like section of the curtain. After extracting the required stock to make a "bunch" and while taking it to a position necessary for its completion, he removes his hand from the shelf, thereby releasing the curtain, which is caused to rise until the rubber portion closes the opening in the front portion of the box, this opening and closing operation being performed at the beginning of the making of each cigar. The opening is due to an almost involuntary movement made while reaching for more material, and the closing is automatic, so that the use of the box does not substantially modify the operator's normal movements or his voluntary effort.

The lower spring roller is in front of the curtain so that any dust falling downward falls behind the curtain and is not caught by the roller. A pedal 19 connected by a cord to the shelf 10 may be used for opening the curtain by foot pressure.

Figure 6:
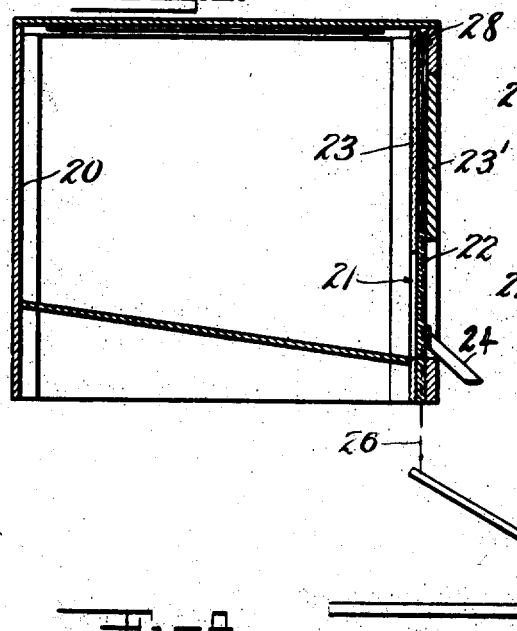
Fig. 6 is a section of a modification.
Figure 7:
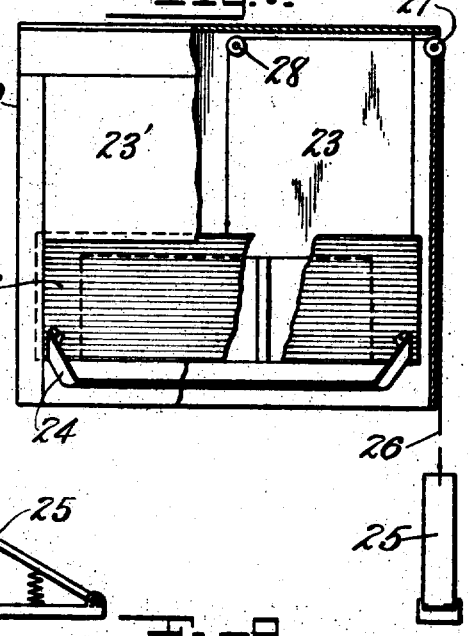
Fig. 7 is a front view of the same, parts being broken away.

In the modification shown in Figs. 6 and 7 there is a box 20 having a cover. The lower front side of the box is provided with an opening 21 in front of which is a curtain 22 in the form of a vertically movable sliding panel guided in suitable runways and protected by an inner wall 23 and an outer wall 23′. This curtain is provided with a forwardly projecting member 24 adapted to be engaged by the hand in reaching upward to the box, which when in use is raised to a point about even with the shoulders of the user. The hand of the operator as he is reaching for the contents of the box first engages the member 24 and then raises the curtain 22 by substantially the movement which would be necessary to reach the contents of the box if the curtain were already raised and holds the curtain raised until the hand is withdrawn whereupon the curtain automatically falls. The member 24, being in the form of a flat bar lying in a horizontal plane, does not materially interfere with the operator's view of the stock in the box when the box is open. In addition I provide means for raising the curtain by the foot of the operator, the same consisting of a pedal 25 connected to the upper part of the curtain 22 by a cable 26 which passes over pulleys 27 and 28. Pressure of the foot upon the pedal 25 raises the curtain and holds it open until the pressure is withdrawn. The pedal is also useful in case it is desired to hold the curtain open after the hand has been withdrawn.

Figure 8:
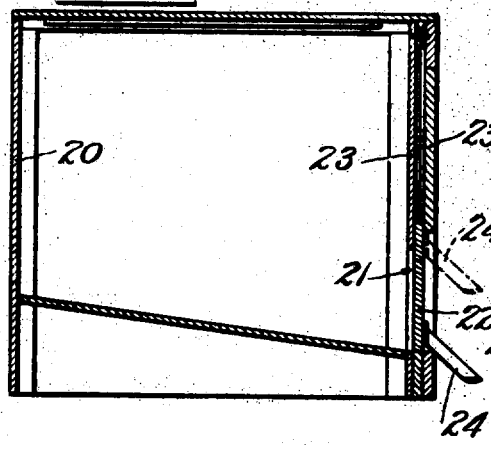
Fig. 8 is a section of another modification.
Figure 9:
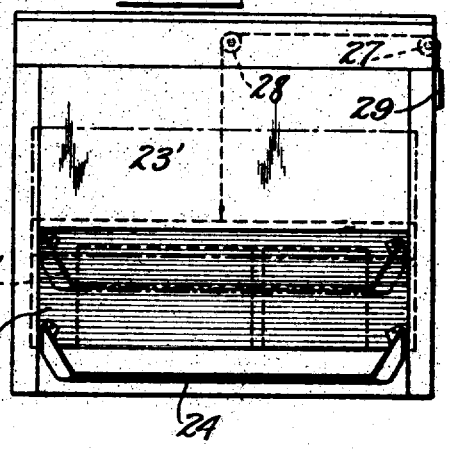
Fig. 9 is a front view of the same.

In the modification shown in Figs. 8 and 9 the construction is the same as in Figs. 6 and 7 except that for the pedal a weight 29 is substituted, the weight partially counterbalancing the weight of the curtain so as to reduce the effort necessary when the box is opened by the engagement of the hand with the member 24.

As will be evident to those skilled in the art, my invention permits of various modifications without departing from the spirit thereof or the scope of the appended claims.

What I claim is:

1. A receptacle arranged to hold conditioned tobacco for cigar makers' use, said receptacle having an opening in the lower portion of its face, means for closing said opening comprising a curtain having an impervious portion and an opening to permit access to said receptacle when said impervious portion is withdrawn from said first named opening, and means tending to hold said curtain in closed position.

2. In a normally closed box, the combination of a box body having an opening in the lower portion of its front face, a closure for said opening adapted to move upward in front of said opening so as to close the same, means normally tending to hold said closure in its uppermost and closing position and an outwardly projecting member connected to the upper end of said closure.

3. In a normally closed box, the combination of a box body having an opening in the lower portion of its front face, a curtain adapted to close and open said opening, said curtain having an opening and an extended portion at its lower end, means normally tending to hold the lower extended portion opposite said box opening, and means for moving said curtain downwardly so as to bring said opening opposite said box opening when desired.

4. In a normally closed box, the combination of a box body having an opening in the lower portion of its front face, a curtain adapted to close and open said opening, said curtain having an opening and an extended portion at its lower end, means normally tending to hold the lower extended portion opposite said box opening, and a projecting member extending from the curtain at a point below said opening and adapted to be engaged by the hand to move the curtain to open position.

5. In a normally closed box, the combination of a box body having an opening in the lower portion of its front face, a curtain adapted to close and open said opening, said curtain having an opening in its center and extended flexible portions at its upper and lower ends, spring rollers on which said ends are wound and tending to hold the lower extended portion opposite said box opening, means whereby said curtain may be moved downward so as to bring said opening opposite said box opening when desired.

6. In a normally closed box, the combination of a box body having an opening in the lower portion of its front face, a curtain adapted to close and open said opening, said curtain having an opening in its center and flexible extended portions at its upper and lower ends, rollers for said ends normally tending to hold the lower extended portion opposite said box opening, and a member connected at a point adjacent to the lower edge of said curtain opening and movable with said curtain.

7. In a normally closed box, the combination of a box body having an opening in the lower portion of its front face, a curtain adapted to close and open said opening, said curtain having an opening in its center, and an extended portion at its lower end, means normally tending to hold the lower extended portion opposite said box opening, a member hinged at a point adjacent to the lower edge of the opening in said curtain and movable with said curtain, and releasable means for holding said member in horizontal position.

8. In a normally closed box, the combination of a box body having an opening in the lower portion of its front face, a curtain adapted to close and open said opening, said curtain having an opening in its center and an extended portion at its lower end, means normally tending to hold the lower extended portion opposite said box opening, a shelf hinged at a point adjacent to the lower edge of the opening in said curtain and movable with said curtain, and releasable means for holding said shelf in horizontal position, said shelf when it is in vertical position and the curtain is in its upper position covering the opening in the face of said box.

9. In a normally closed box, the combination of a box body having an opening in its front face, a closure for said opening adapted to move upward in front of said opening so as to close the same, means normally tending to hold said closure in its uppermost and closed position, and an outwardly projecting elongated member connected to the upper end of said closure and extending along said closure adjacent to its upper edge.

10. In a normally closed box, the combination of a box body having an opening in its front face, a closure for said opening adapted to move across said opening to close the same and tending to move toward closed position, and an elongated projecting member secured to said closure and extending along said closure adjacent to the forward edge of said closure.

CHARLES H. KORS.

Copies of this patent may be obtained for five cents each, by addressing the "Commissioner of Patents. Washington, D. C."